United States Patent [19]

Khelifa

[11] Patent Number: 5,388,423
[45] Date of Patent: Feb. 14, 1995

[54] APPARATUS FOR AND METHOD OF COOLING AND/OR HEATING A COMPARTMENT

[75] Inventor: Noureddine Khelifa, Munich, Germany

[73] Assignee: Behr GmbH & Co., Stuttgart, Germany

[21] Appl. No.: 851,655

[22] Filed: Mar. 16, 1992

[30] Foreign Application Priority Data

Mar. 19, 1991 [DE] Germany .......................... 9112332[U]
Aug. 6, 1991 [DE] Germany .............................. 4125993

[51] Int. Cl.⁶ ...................... F25B 27/00; G05D 23/00; B60H 1/02
[52] U.S. Cl. ...................... 62/238.3; 62/480; 62/271; 237/2 B; 237/12.3 A
[58] Field of Search ............. 237/12.3 R, 12.3 C, 237/12.3 A, 12.3 B, 2 A; 62/238.3, 238.6, 476, 477, 271, 92, 93, 94, 239

[56] References Cited

U.S. PATENT DOCUMENTS

| | | | |
|---|---|---|---|
| 2,075,036 | 3/1937 | Hollis | 62/94 X |
| 2,344,384 | 3/1944 | Altenkirch | 183/4.7 |
| 2,730,874 | 1/1956 | Schelp | 62/138 |
| 5,230,466 | 7/1993 | Moriya et al. | 62/94 X |

FOREIGN PATENT DOCUMENTS 572293 11/1958 Belgium .
0167096 1/1986 European Pat. Off. .
3424278 1/1986 Germany .

OTHER PUBLICATIONS

Patent Abstracts of Japan, vol. 8, No. 174 (M-316)(1611) Aug. 10, 1984.

Primary Examiner—Henry A. Bennet
Attorney, Agent, or Firm—Foley & Lardner

[57] ABSTRACT

Method of and apparatus for heating or cooling a motor vehicle passenger compartment which communicates with a supply air duct for supplying a stream of air to the compartment and a used air duct for exhausting air from the compartment. A heat source in the form of a sorption reactor transfers heat energy to the air stream, with the reactor being provided with a sorbent such as zeolite or the like. The air stream passes through the reaction chamber of the reactor for extracting moisture from the air stream and adding adsorption heat to the air stream. The air stream then passes through an inflow duct before passing through the reactor, and passes from the reactor through an outflow duct at the outlet end of the reactor. A fresh air duct is provided for selectively feeding fresh air into the inflow duct, and an exhaust air duct opening into the atmosphere is provided for selectively communicating the outflow duct with the exhaust air duct.

17 Claims, 6 Drawing Sheets

APPARATUS FOR AND METHOD OF COOLING AND/OR HEATING A COMPARTMENT

FIELD OF THE INVENTION

The invention relates to an apparatus for heating and/or cooling a compartment, in particular a passenger compartment in a motor vehicle, and a method of cooling and/or heating using such an apparatus.

PRIOR ART

In the case of known motor vehicles with a combustion engine, there is available an adequate amount of heat to be dissipated, permitting adequate heating of the passenger compartment even on cold winter days. In the case of motor vehicles without a combustion engine, such as, for example, in the case of electric vehicles, hybrid vehicles or the like, waste heat occurs only to a slight extent and is not adequate for heating the passenger compartment. The same applies to the air-conditioning of a passenger compartment if the combustion engine is not in operation.

For cooling the drive components of an electric vehicle, cooling ducts for a liquid coolant are known, by means of which ducts all components involving heat development are flowed through, in order to dissipate the heat energy from them. Since the temperature profile is subject to very great fluctuations and, at least in the short term, even considerable quantities of heat have to be dissipated, a heat exchanger arranged in the coolant stream must be designed in terms of its heat transfer capacity to the most unfavorable maximum operating point.

Apart from the heat dissipation from the drive components, cooling of the passenger compartment in cases of high outside temperatures and possibly high relative atmospheric humidity is also desirable, it being required that the energy expenditure for cooling is as low as possible and environmentally harmless substances are used as the coolant.

SUMMARY OF THE INVENTION

The invention is based on the object of providing an apparatus for heating and/or cooling a compartment, in particular a passenger compartment in a vehicle without a combustion engine, or a vehicle in which the combustion engine is not in operation, by means of which apparatus heating or cooling is possible with low energy consumption and using environmentally harmless substances.

The object is achieved according to the invention by providing an apparatus with an absorption reactor which requires only little auxiliary energy during the heating or cooling of the passenger compartment. Zeolite is an environmentally harmless sorbent and permits a simple, easily maintained heating and/or cooling apparatus.

For cooling the compartment, according to the invention, the compartment air is extracted via the used air duct, preferably via an air/air heat exchanger, and is fed via the inflow duct to the reaction chamber. The dehumidified air leaving the outflow duct of the reaction chamber is cooled with surrounding air in a first air/air heat exchanger and with used compartment air in a second air/air heat exchanger, and is adiabatically cooled further in an evaporator by evaporating water to the cooling limit. The cooled air can then be introduced via the supply air duct directly into the compartment.

If the apparatus according to the invention is to be used for heating, a moist air stream is fed via the inflow duct to the reaction chamber, which stream is dehumidified by absorption in the sorption reactor and thereby takes up heat, the dry warm air stream leaving the outflow duct giving off its heat energy in an air/air heat exchanger to a cooling air stream, which is fed as a heating air stream to the compartment. The cooling air stream may be composed in freely selectable components of fresh air and return air. The used air from the compartment flows through an evaporator, from which the moist air, preheated by a further heat exchanger, flows to the sorption reactor.

In further development of the invention, the supply air duct is connected via an air-conducting channel to the used air duct, and at least one blower for generating an appropriate air flow is arranged in the air-conducting duct. As a heat source, a cooler, located in a cooling circuit of the drive components and impinged by the coolant thereof, is provided, the blower and the cooler being arranged one after the other in the air-conducting duct. Upstream of the cooler there is also fitted a first air stream control element, which controls the component comprising return air and exhaust air. Downstream of the cooler, a second air stream control element controls the component comprising heating air introduced into the passenger compartment and cooling air conducted away to the atmosphere. The sorption reactor is arranged downstream of the second air stream control element.

On account of the control elements and the blower, an adequate cooling air stream through the cooler is always provided, whereas the heat energy dissipated from the cooler and also the heat energy contained in the return air stream of the air-conducting duct are fed to the passenger compartment only when it is needed and selectively according to the required amount of heat. In addition, the air fed in is dehumidified.

Further auxiliary units involving heat development may be connected to the cooling circuit, for example, a coolant pump, which is driven by an electric motor, is provided for the circulation of the coolant. In order to achieve an optimum design of the cooler, it is expedient if the cooling liquid is fed to the latter at a relatively constant temperature level. For this purpose, a heat accumulator, which compensates for the extreme fluctuations of the heat development in the individual components, is provided before entry of the coolant into the cooler. Particularly suitable at this point is a latent heat accumulator, by means of which it is possible, after a short interruption in driving, to provide heat energy again immediately for heating the passenger compartment.

Further features of the invention will be apparent from the description and the drawings, in which illustrative embodiments of the invention are described and illustrated.

DETAILED DESCRIPTION OF THE PREFERRED EMBODIMENTS

Figure 1:
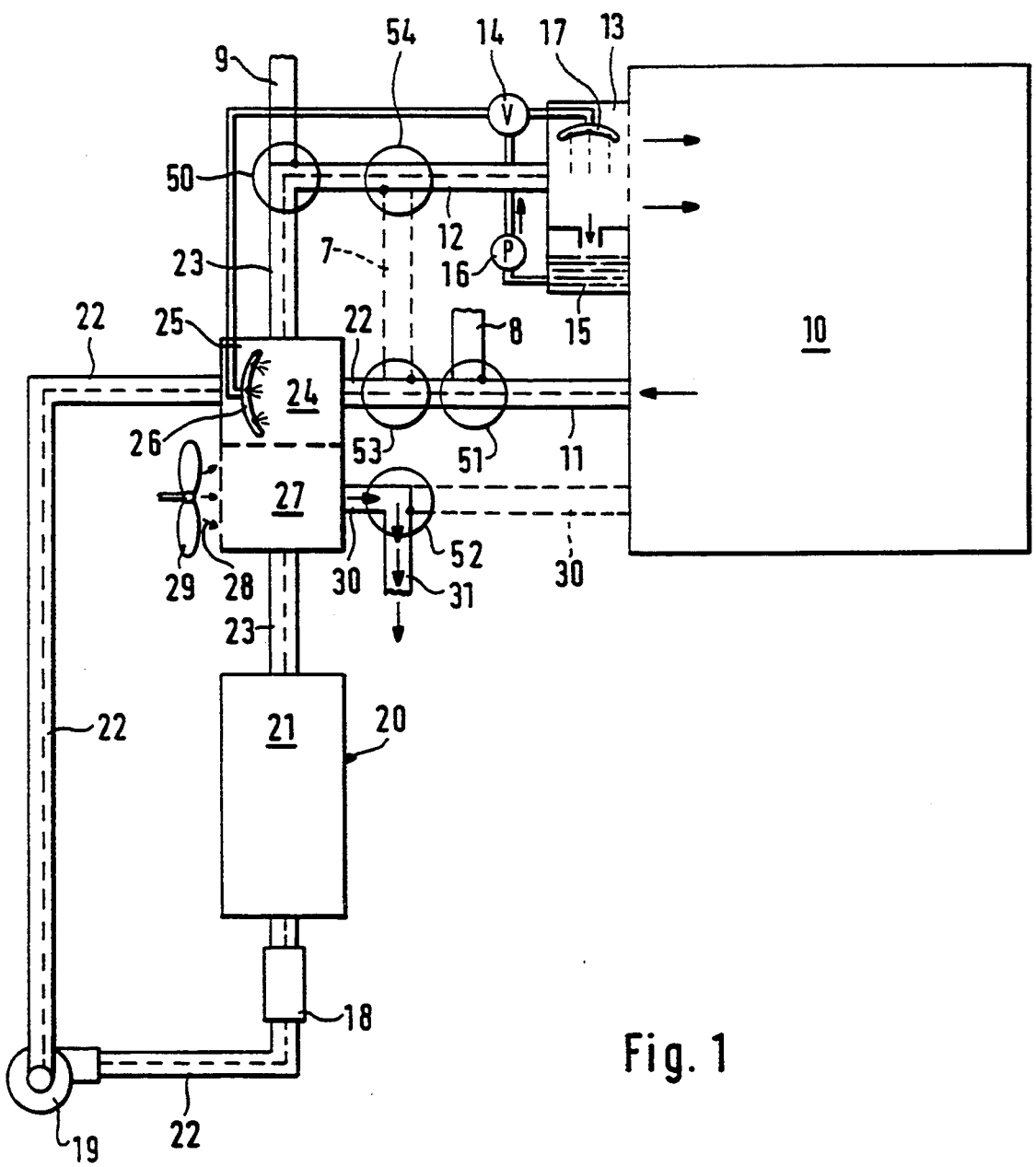
FIG. 1 shows diagrammatically an apparatus according to the invention for cooling a compartment.

Diagrammatically shown in FIGS. 1 to 4 is an apparatus for heating and/or cooling a compartment 10, in particular the passenger compartment of a motor vehicle. The apparatus includes an energy accumulator (heat source), a sorption reactor 20 with a sorbent, such as zeolite or the like, as well as air ducts, through which air streams are conducted according to the operating state by means of air stream control elements.

The reaction chamber 21 of the sorption reactor 20 is fed, via an inflow duct 22, a compartment air stream, which in cooling operation (FIG. 1) is sucked off via a used air duct 11, and in heating operation (FIG. 2) is sucked off via an evaporator 13, the air stream passing through supply air duct 12, air stream control element 54, air duct 7 and air stream control element 53. The used air duct 11 is connected to the inflow duct 22 via an air stream control element 51, which in position 1 establishes a flow connection between the inflow duct and the used air duct and in a position 2 closes the used air duct 11 and connects the inflow duct 22 to a fresh air duct 8.

The outflow duct 23, conducting a dry warm air stream, of the reaction chamber 21 is connected in cooling operation via an air stream control element 50 to the supply air duct 12 of the compartment 10. In position 1, the warm air stream passes from the outflow duct 23 into the supply air duct 12, whereas in position 2 of the air stream control element 50 the supply air duct 12 is closed and the outflow duct 23 opens out into an exhaust air duct 9.

An evaporator 13 is arranged in the supply air duct 12, preferably directly adjacent to the compartment 10. Water is fed from a water reservoir 15 by means of a pump 16 via a valve 14 to suitable surfaces 17 for evaporation.

The outflow duct 23 and the inflow duct 22 are in heat-transferring connection. For this purpose, a heat exchanger 24, preferably a cross-flow heat exchanger, is arranged. A further evaporator 25 having suitable surfaces is advantageously arranged in the inflow duct 22.

A heat-dissipating heat exchanger 27, which may form a unit with the heat exchanger 24, is arranged between the sorption reactor 20 and the cross-flow heat exchanger 24. A cooling air stream 28 flows through the heat exchanger 27, generated by a cooling blower 29. The cooling air stream leaving the heat exchanger 27 is conducted away into the atmosphere via a cooling air duct 30 and an exhaust air duct 31.

For cooling the compartment (FIG. 1), compartment air is extracted via the used air duct 11, flows through the heat exchanger 24 as an exhaust air stream and is heated. The used air stream enters the sorption reactor 20 via the inflow duct 22. The sorbent, zeolite in the illustrative example shown, adsorbs the moisture, adsorption heat being produced, which results in heating up of the flowed-through air. The air leaving the outflow duct 23 is consequently a dry warm air stream, which is cooled in the heat exchanger 27 by the cooling air stream 28, and in the heat exchanger 24 gives off the residual heat for heating up the used air extracted from the compartment. The cooled, dried air flows via the control element 50 into the supply air duct 12 and the evaporator 13, where it is adiabatically cooled with evaporation of water up to the cooling limit. The cooled air preferably enters directly into the compartment from the evaporator. By drying in the sorption reactor, precooling in the heat exchangers and adiabatic rehumidifying of the air, the compartment can thus be cooled.

The air flow from the compartment to the sorption reactor 20 and back to the compartment is maintained by means of a blower 19, which is arranged in the inflow duct 22. Also arranged in the inflow duct 22, ahead of entry into the reaction chamber 21, is a heating apparatus 18, the functional principle of which is further described below.

If the apparatus according to FIG. 1 is to be used not only for cooling the compartment 10, the ducts drawn in broken lines are to be arranged as in the illustrative embodiment shown. A bridge duct 7 connects the inflow duct 22 to the supply air duct 12 via air stream control elements 53 and 54. The cooling air duct 30 is designed to open out into the compartment 10, the exhaust air duct 31 being connected to the duct 30 via an air stream control element 52.

Figure 2:
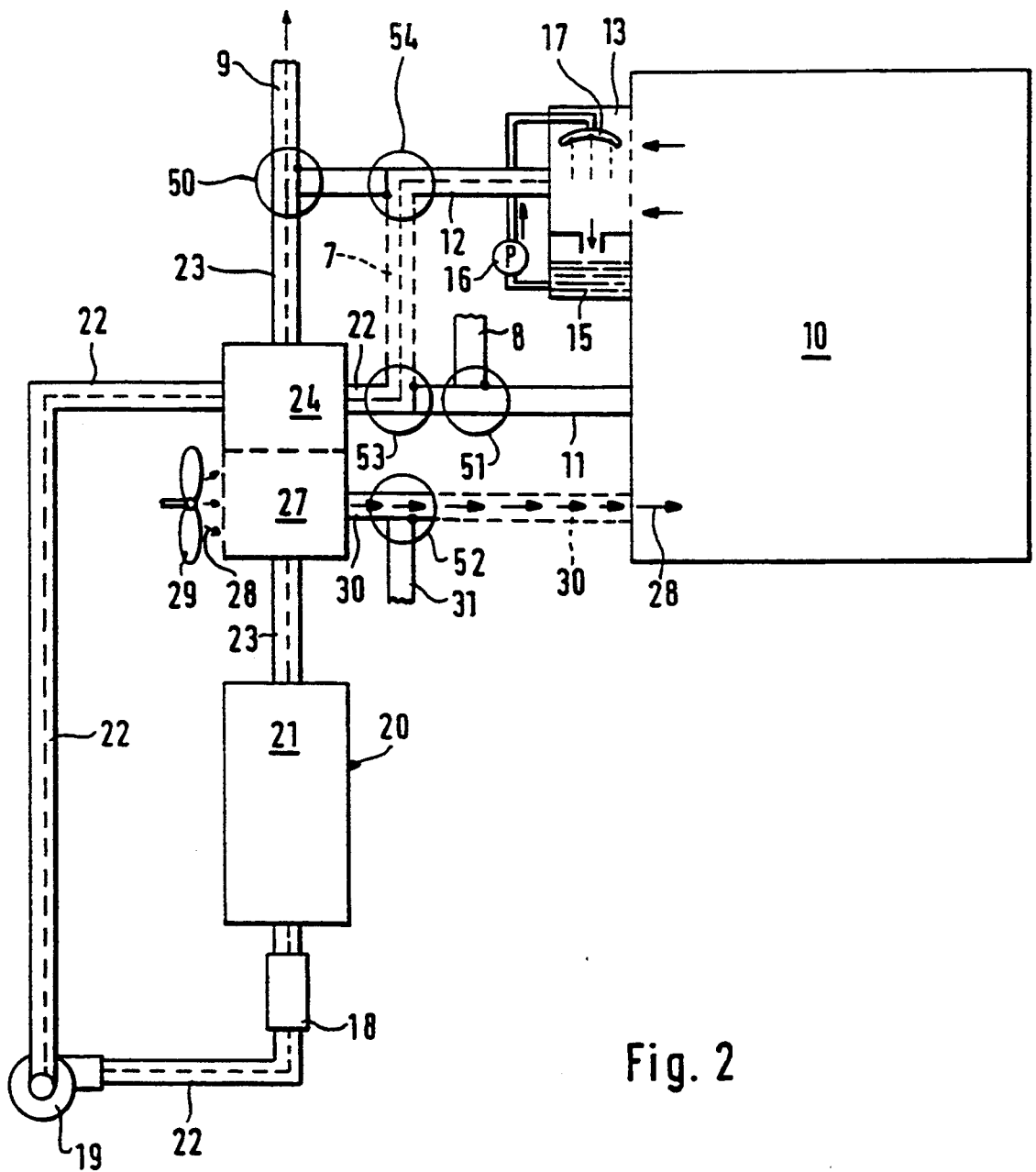
FIG. 2 shows diagrammatically the apparatus according to FIG. 1, in a mode for heating a compartment.

For heating the compartment 10, the air stream control elements 50, 52, 53 and 54 are switched over into position 2, as shown in FIG. 2, so that their flaps open the bridge duct 7 and the cooling air duct 30, respectively.

Figure 3:
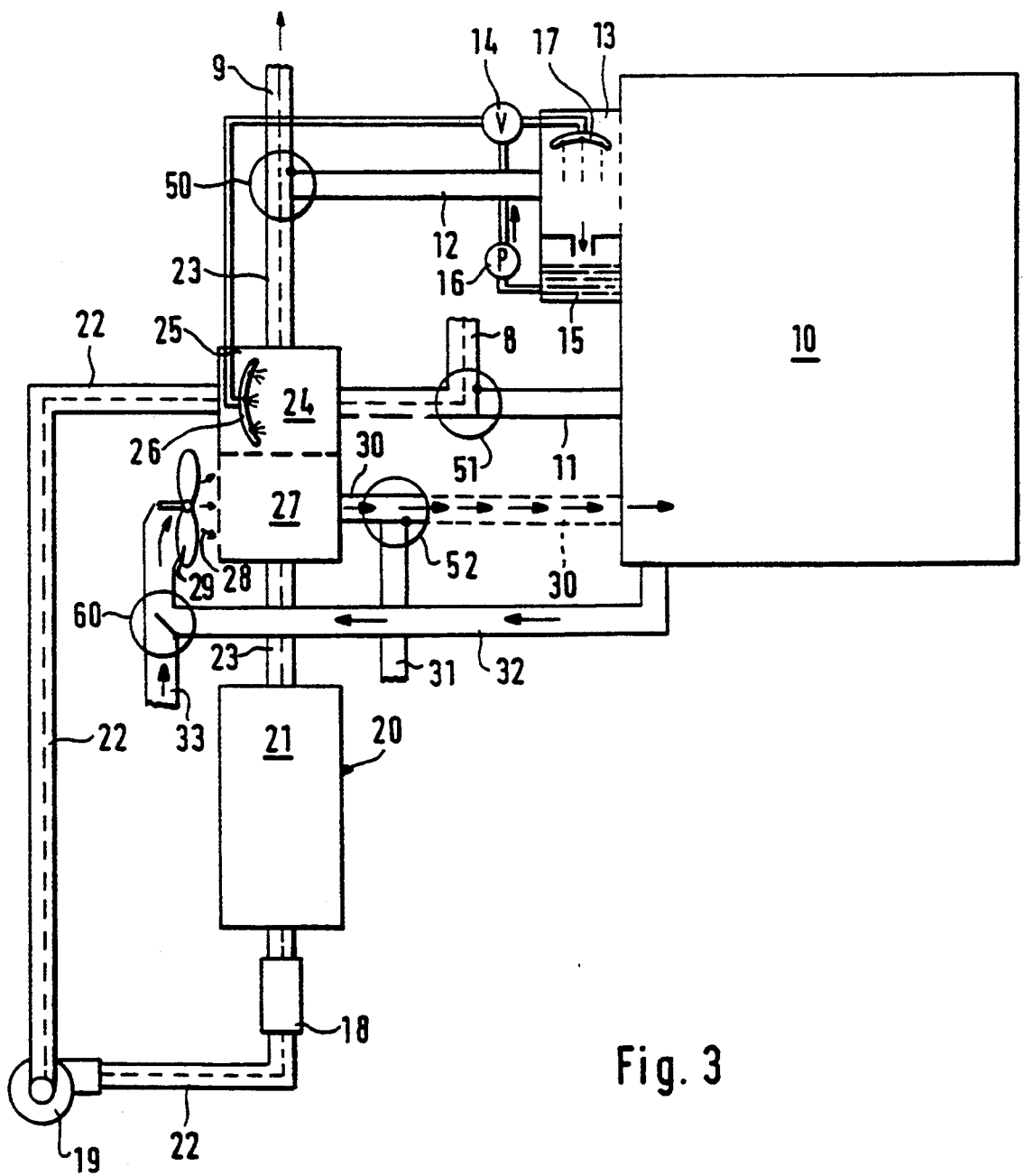
FIG. 3 shows diagrammatically a further illustrative embodiment of an apparatus according to the invention for heating a compartment.

In this case, warm used air is sucked in from the compartment 10 via the supply air duct 12 and preferably absorbs water to saturation in the evaporator 13. Via the supply air duct 12 and the control element 54, the exhaust air enters the inflow duct 22 via the bridge duct 7 and the control element 53 and flows through, as described in FIG. 1, the reaction chamber 21 of the sorption reactor 20. The warm air leaving via the outflow duct 23 gives off its heat in the heat exchanger 27 to the cooling air stream 28, which is generated by the cooling blower 29. The cooling air stream is composed of fresh air and return air, the return air being sucked out of the compartment by the air stream control element 60 (FIG. 3). The cooling air stream 28 enters the compartment 10 as heating air via the cooling air duct 30. The cooled air is passed to atmosphere via the exhaust air duct 9.

Alternatively, the apparatus may also be used for heating as shown in the representation in FIG. 3. Fresh air is fed to the inflow duct 22 via the fresh air duct 8 and the air stream control element 51, in position 2. This fresh air is warmed in the cross-flow heat exchanger 24 and humidified to saturation by means of the evaporator 25. The warmed, humidified fresh air flows into the reaction chamber 21 of the sorption reactor 20 and leaves as a dry warm air stream through the outflow duct 23, which is connected via the air stream control element 50, in position 2, to the exhaust air duct 9. The adsorption heat dissipated from the sorption reactor 20 is given off via the heat exchanger 27 to the cooling air stream 28, which enters into the compartment 10 as hot air via the cooling air duct 30.

The cooling blower 29 sucks in compartment air via a return air duct 32, fresh air being sucked in at the same time from a fresh air duct 33 via a control member 60. Depending on the operating conditions, the sucked-in compartment air may be fed a corresponding component of fresh air, this mixed air stream flowing through the heat exchanger 27 as a cooling air stream and entering the compartment 10 as heating air.

In the case of the configuration according to FIG. 3, the bridge duct 7 represented in broken lines in FIGS. 1 and 2 may be omitted.

Figure 4:
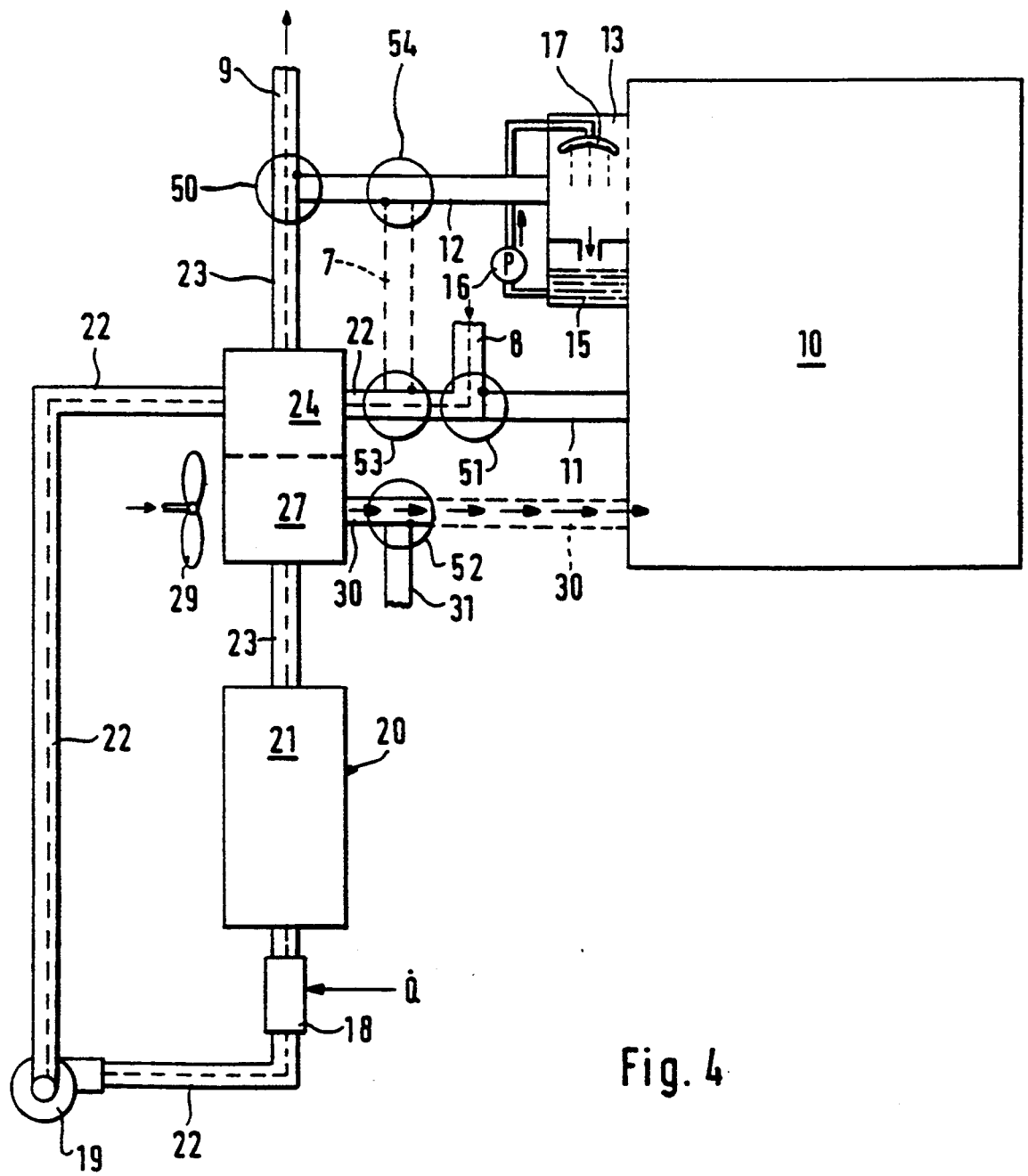
FIG. 4 shows diagrammatically the apparatus according to FIG. 1, in the desorbing operating state.

Once the sorption reactor 20 has received a certain amount of water, desorption must be carried out for regeneration. For this purpose, as represented in FIG. 4, fresh air, which before entering into the reaction chamber 21 is heated up in the heating device 18, is fed to the inflow duct 22 via the fresh air duct 8. An electric radiator, which is in operation for example for charging the storage batteries of an electric vehicle, may be used as the heating device 18. In the case of a vehicle with a combustion engine, the necessary heat energy may be taken from the exhaust gas via a heat exchanger. The heated-up fresh air absorbs water from the sorbent and conducts it away via the outflow duct 23, the heat exchanger 24, and the exhaust air duct 9. In the heat exchanger 24, the moist, warm air from the sorption reactor gives off heat to the fresh air, as a result of which part of the waste heat is recovered. The end of the desorption operation can be determined from a rise in the temperature in the outflow duct 23. The temperature rise at the end of the desorption operation can be advantageously utilized for heating the compartment 10, for which purpose the cooling blower 29 can be switched on and the cooling air stream fed to the compartment as heating air via the cooling air duct 30.

Figure 5:
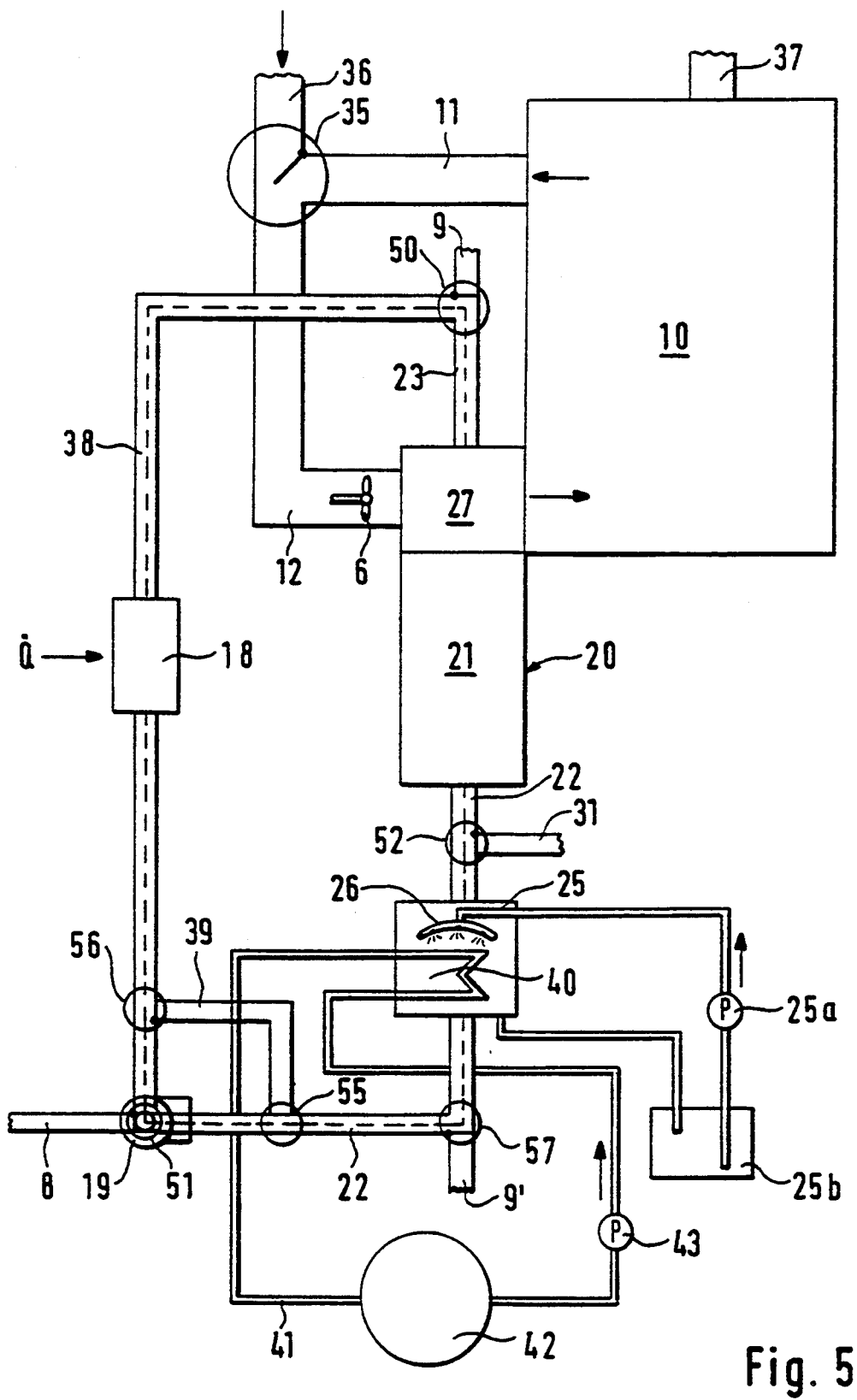
FIG. 5 shows a further illustrative embodiment of an apparatus according to the invention for heating a compartment.

The illustrative embodiment of the apparatus according to the invention according to FIG. 5 serves exclusively for heating a compartment 10, for example, the passenger compartment of an electric vehicle. In this case, using an air stream control element 35, used air is drawn from the compartment 10 through the used air duct 11, and fresh air is sucked in via the duct 36 and blown into the compartment 10 via the supply air duct 12. An exhaust air component, corresponding to the fresh air component, is given off to atmosphere via the exhaust air nozzle 37. A blower 6, arranged in the supply air duct 12, ensures adequate air circulation.

As already described with respect to the previous illustrative embodiments according to FIGS. 1 to 4, a heat exchanger 27, preferably a cross-flow heat exchanger, through which the dry warm air is conducted and the adsorption heat taken up is given off to the surrounding flow, is arranged in the supply air duct 12.

The supply air duct 22 to the reaction chamber 21 of the sorption reactor 20 is connected via a return air duct 28 to the outflow duct 23. The air circulation in the closed circuit thus formed is maintained by the blower 19. The dry return air of the sorption reactor, cooled by the heat dissipation in the heat exchanger 27, is humidified to the saturation limit in the evaporator 25 before re-entry into the reaction chamber 21. The evaporator has a water circuit which is operated by a pump 25$a$ and continuously delivers water from a water reservoir 25$b$ to suitable surfaces 26 for evaporation. A heat exchanger 40 of a cooling circuit 41, which dissipates waste heat, is advantageously integrated in the evaporator 25. The heat take up side of the cooling circuit operated by the pump 43 is represented schematically at 42.

The outflow duct 23 can be connected, according to choice, to the exhaust air duct 9 or to the return air duct 38 via the air stream control element 50, whereas the fresh air duct 8 or the return air duct 38 can be selectively connected to the inflow duct 22 via the air stream control element 51 integrated in the blower.

If heating of the compartment 10 is not necessary, the heat taken up by the cooling circuit 41 must nevertheless be dissipated. In flap position 2 of the air stream control element 51, the blower 19 sucks fresh air in via the fresh air duct 8, which air can be blown off via an exhaust air duct 31, which branches off via the air stream control element 52, in position 1, between the evaporator 25 and the sorption reactor 20.

If the heat-accumulating sorption reactor 20 has to be desorbed, this can be performed, as described with respect to FIG. 4, by opening the fresh air duct and the exhaust air duct, with the addition of heat energy. It is preferable to arrange between the inflow duct 22 and the return air duct 38 a bypass duct 39, which bypasses the blower 19 and connects said ducts via air stream control elements 55 and 56. In position 1 of the air stream control elements 55 and 56, the bypass duct 39 is closed; in position 2 of the air stream control elements 51, 55 and 56, air is sucked in from the fresh air duct 8 and fed via the bypass duct 39 directly from the blower 19 into the return air duct 38, so that the fresh air heated up by feeding in the heat energy Q flows into the reaction chamber 21 via the outflow duct 23, involving reversal of the previous direction of flow. For removal of this air carrying away water, an exhaust air nozzle 9' is arranged on the inflow duct 22, the air stream control element 57 of which nozzle ensures in position 2 a flowing away of the fed-in fresh air in the desorption phase.

With the heating apparatus according to FIG. 5, adequate heating of the passenger compartment is possible over a limited period of time even in the case of an electric vehicle, a hybrid vehicle or some other vehicle designed without a combustion engine, as also in the case of auxiliary air-conditioning. The small amounts of heat to be dissipated in the case of a vehicle without a combustion engine can be advantageously utilized for enriching the reaction air fed to the sorption reactor 20 with water.

Figure 6:
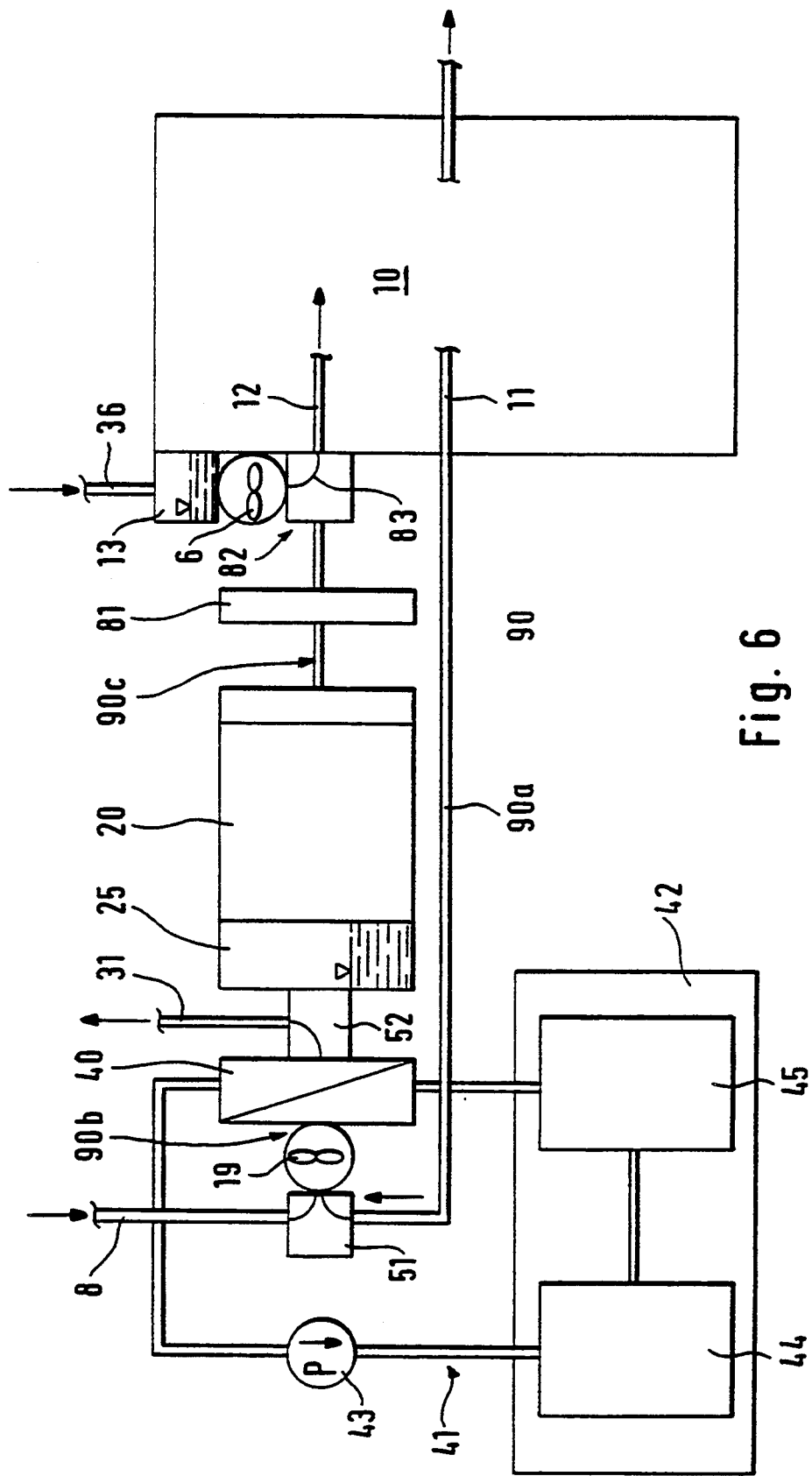
FIG. 6 shows diagrammatically an apparatus for heating a compartment of an electric vehicle.

The apparatus shown in FIG. 6 serves in particular to heat the compartment 10 or a passenger compartment of an electric vehicle. A supply air duct 12 and a used air duct 11 are connected to the compartment 10. The used air duct 11 is connected via an air-conducting duct 90 to the supply air duct 12. The air-conducting duct 90 has essentially three sections 90$a$, 90$b$, 90$c$. The first section 90$a$ of the air-conducting duct 90 extends from the used air duct 11 to a first air stream control element 51. The second section 90$b$ of the air-conducting duct 90 begins at the first air stream control element 51 and extends to a second air stream control element 52 through a blower 19 and a cooler 40 for cooling the electric drive unit 44.

From the second air stream control element 52, the third section 90$c$ of the air-conducting duct 90 leads to the supply air duct 12 at the passenger compartment 10. In the third section 90$c$ of the air-conducting duct 90, a humidifier 25, a sorption reactor 20 designed as a zeolite accumulator, and an electric auxiliary heating means 81 are arranged in series one behind the other. Without heat recovery from the exhaust air, a high return air component is required for energy-related reasons. Due to the evaporation of moisture from the vehicle occupants, the relative humidity in the passenger compartment increases when there is a high return air component. Therefore, to accomplish a high return air component a drying device is necessary. In the sorption reactor 20, the water of the air stream is adsorbed by the zeolite contained therein, as a result of which said air stream is dried. The heat released during this process further heats up the air stream. The sorption reactor 20 consequently also serves as a heat accumulator. If the moistness of the air stream is too low, it is increased in the humidifier 25, in order then to be able to release heat to a greater extent from the sorbent, advantageously zeolites. A fresh air duct 36 conducting cold air opens out into the air mixing chamber 82, the component of cold or fresh air being mixed in by control element 83 with the air stream conducted in this section 90c. To make the required amount of fresh air or cold air available, a blower 6 is provided in the fresh air duct 36. For cooling the fresh air, an evaporation cooler 13 is arranged in the fresh air duct 36.

The cooler 40, through which flows the air stream in the second section 90b of the air-conducting duct 90, is impinged on the other side of the heat exchanger walls by the coolant of a cooling circuit 41 for the drive unit 44 of the electric vehicle. In this case, the coolant of the cooling circuit 41 serves not only for cooling the drive motor itself, but also the entire arrangement comprising motor, transmission, power control and battery unit. In the cooling circuit 41 there is a coolant pump 43 for moving the coolant. Owing to fluctuations occurring in the heat development in the components of the drive 44, a buffering heat accumulator 45 is provided, which is preferably designed as a latent heat accumulator. The temperature fluctuations are dampened by the heat accumulator 45, as a result of which the heat fed to the cooler 40 remains at a level kept relatively constant within certain limits.

Heating operation for the passenger compartment is dependent on several influences, but primarily on the ambient temperatures, the solar irradiation and on the interior temperature in the passenger compartment. Therefore, the "heating" function and the required amount of heat must be set according to needs, whereas the cooling of the drive is always required in driving operation of the electric vehicle, even if the cooling power requirement is subject to certain fluctuations, which are dictated, for example, climatically or by the power profile.

The cooling of the drive takes place by the coolant flowing through corresponding cooling ducts of the motor, the transmission, the battery (if appropriate with an intermediate heat transfer medium circuit) and the power control, the coolant being moved in the cooling circuit 41 with the aid of the coolant pump 43. The heat generation and the amount of heat consequently to be dissipated are subject to extreme fluctuations, in particular under load changes such as during acceleration, braking etc. In order that the cooler 40 does not have to be made unnecessarily large in its dimensions, the heat accumulator 45 has the function of a thermal buffer, which is capable of taking up the amounts of heat, frequently occurring only briefly, and of feeding the coolant to the cooler 40 at a relatively constant temperature level. In the cooler 40, the heat contained in the coolant is given off to the air flowing through the second section 90b of the air-conducting duct 90.

If the vehicle is operated in outside temperatures which do not require heating of the passenger compartment 10, the air stream required for heat take-up in the cooler 40, which air stream is generated by the blower 19, is sucked in almost completely through the fresh air duct 8 and blown through the cooler to the second air stream control element 52. If there is no heating requirement for the passenger compartment 10, the second air stream and control element 52 is in a position which directs away the entire volume of air blown through the cooler 40 out into the open through the exhaust air duct 31.

Due to the oxygen required by the vehicle occupants, a certain volume of air must be constantly renewed in the passenger compartment. For this purpose, the blower 6 generates an air stream in the fresh air duct 36, it being possible, as need be, for the temperature of the fresh air to be lowered in the evaporation cooler 13. This cold air is then directed through the air mixing chamber 82 and the supply air duct 12 into the passenger compartment 10. The same volume of air is extracted at another point from the passenger compartment 10 and given off to the surroundings via the exhaust air duct 31.

If there is a heating requirement for the passenger compartment 10, the second air stream control element 52 is adjusted, as a result of which air directed through the cooler 40 and warmed is partly or completely directed through the third section 90c of the air-conducting ducts 90 and the sorption reactor 20, and then through the supply air duct 12 into the passenger compartment 10.

In addition to the heating up of the air stream in the cooler 40, the heat energy contained in the zeolite in the sorption reactor 20 is also given off to the heating air stream. In the case of a still higher heating requirement, the temperature level can be additionally raised further by the electric auxiliary heating means 81, which should be used only in exceptional cases, however, since the electric energy required for this purpose is generally taken from the battery unit of the electric vehicle.

The electric auxiliary heating means 81 offers a great advantage during the period of charging the battery unit. With the charging current for the battery unit, a corresponding current can also be fed in for the electric auxiliary heating means 81. Upon switching on the electric auxiliary heating means 81, advantageously at least one of the blowers 6 or 19 is set in operation and the air is moved in the air-conducting duct 90. A volume of air which corresponds to the heating air blown in through the supply air duct 12 into the passenger compartment 10 is sucked off through the used air duct 3 out of the compartment and is fed once again through the first and second sections 90a and 90b of the air-conducting duct 90 to the electric auxiliary heating means 81 and is further heated up.

If the air stream control element in the air mixing chamber 82 is set in such a way that the cold air flowing in via the fresh air duct 36 enters the section 90c of the air-conducting duct 90 and flows to the sorption reactor 20, the air stream is heated up by means of the electric auxiliary heating means 81 and serves for the desorption of the sorbent in the reactor 20. The moist air stream leaving the reactor 20 is directed away via the air stream control element 52 and the exhaust air duct 31.

In the illustrative embodiments shown, the air stream control elements are represented in the blocking position or passing position. Depending on the desired temperature of the cooling air stream and of the heating air, regulation is possible by providing a multiplicity of intermediate positions of these air stream control elements.

What is claimed is:

1. Apparatus for heating or cooling a motor vehicle passenger compartment communicating with a supply air duct for supplying a stream of air to the compartment and a used air duct for exhausting air from the compartment, comprising:

a heat source for transferring heat energy to the air stream, said heat source comprising a sorption reactor provided with a sorbent, said reactor having a reaction chamber through which the air stream passes for extracting moisture from the air stream and adding adsorption heat to the air stream, an inflow duct upstream of said sorption reactor through which the air stream passes to said reactor, an outflow duct at the outlet end of said reactor for conveying the treated air stream away from the reactor, a fresh air duct for feeding fresh air into said inflow duct, and an air stream control element for selectively communicating said fresh air duct with said inflow duct, and an exhaust air duct opening into the atmosphere, and a further air stream control element for selectively communicating the outflow duct with said exhaust air duct, wherein at least one heat exchanger is provided which is disposed in at least one of the inflow duct and the outflow duct, and wherein energy of the air stream in one of the inflow and outflow ducts is yielded in this heat exchanger to the air stream in the other of the inflow and outflow ducts.

2. The apparatus as claimed in claim 1, wherein said outflow duct can be selectively connected by said further air stream control element to said supply air duct or to said exhaust air duct.

3. The apparatus as claimed in claim 1, further including an evaporator which communicates with said supply air duct.

4. Apparatus for heating or cooling a compartment communicating with a supply air duct for supplying a stream of air to the compartment and a used air duct for exhausting air from the compartment, comprising:

a heat source for transferring heat energy to the air stream, said heat source comprising a sorption reactor provided with a sorbent, said reactor having a reaction chamber through which the air stream passes for extracting moisture from the air stream and adding adsorption heat to the air stream, an inflow duct upstream of said sorption reactor through which the air stream passes to said reactor, an outflow duct at the outlet end of said reactor for conveying the treated air stream away from the reactor, a fresh air dust for feeding fresh air into said inflow duct, and an air stream control element for selectively communicating said fresh air duct with said inflow duct, and an exhaust air duct opening into the atmosphere, and a further air stream control element for selectively communicating the outflow duct with said exhaust air duct, wherein said inflow duct can be selectively connected by said first recited air stream control element to said used air duct or to said fresh air duct.

5. The apparatus as claimed in one of claim 1, wherein said outflow duct and said inflow duct are in heat-exchanging relation by means of a cross-flow heat exchanger.

6. Apparatus for heating or cooling a compartment communicating with a supply air duct for supplying a stream of air to the compartment and a used air duct for exhausting air from the compartment, comprising;

a heat source for transferring heat energy to the air stream, said heat source comprising a sorption reactor provided with a sorbent, said reactor having a reaction chamber through which the air stream passes for extracting moisture from the air stream and adding adsorption heat to the air stream, an inflow duct upstream of said sorption reactor through which the air stream passes to said reactor, an outflow duct at the outlet end of said reactor for conveying the treated air stream away from the reactor, a fresh air duct for feeding fresh air into said inflow duct, and an air stream control element for selectively communicating said fresh air duct with said inflow duct, and an exhaust air duct opening into the atmosphere, and a further air stream control element for selectively communicating the outflow duct with said exhaust air duct, further including a heat exchanger, through which a cooling air stream flows, arranged in said outflow duct, said cooling air stream being heated in said heat exchanger and passing to the compartment as a heated air stream.

7. Apparatus for heating or cooling a compartment communicating with a supply air duct for supplying a stream of air to the compartment and a used air duct for exhausting air from the compartment, comprising:

a heat source for transferring heat energy to the air stream, said heat source comprising a sorption reactor provided with a sorbent, said reactor having a reaction chamber through which the air stream passes for extracting moisture from the air stream and adding adsorption heat to the air stream, an inflow duct upstream of said sorption reactor through which the air stream passes to said reactor, an outflow duct at the outlet end of said reactor for conveying the treated air stream away from the reactor, a fresh air duct for feeding fresh air into said inflow duct, and an air stream control element for selectively communicating said fresh air duct with said inflow duct, and an exhaust air duct opening into the atmosphere, and a further air stream control element for selectively communicating the outflow duct with said exhaust air duct, further including an evaporator provided with a controllable water inlet valve for moistening the air stream, which evaporator is arranged upstream of said reaction chamber in said inflow duct.

8. The apparatus as claimed in claim 1, further including a heating device arranged in the inflow duct ahead of said reaction chamber.

9. The apparatus as claimed in claim 1, wherein said outflow duct can be selectively connected by said further air stream control element to said return air duct or to said exhaust air duct, and said inflow duct can be selectively connected to a return air duct or to said fresh air duct.

10. Apparatus for heating or cooling a compartment communicating with a supply air duct for supplying a stream of air to the compartment and a used air duct for exhausting air from the compartment, comprising:
- a heat source for transferring heat energy to the air stream, said heat source comprising a sorption reactor provided with a sorbent, said reactor having a reaction chamber through which the air stream passes for extracting moisture from the air stream and adding adsorption heat to the air stream,
- an inflow duct upstream of said sorption reactor through which the air stream passes to said reactor,
- an outflow duct at the outlet end of said reactor for conveying the treated air stream away from the reactor,
- a fresh air duct for feeding fresh air into said inflow duct, and an air stream control element for selectively communicating said fresh air duct with said inflow duct, and
- an exhaust air duct opening into the atmosphere, and a further air stream control element for selectively communicating the outflow duct with said exhaust air duct,
- said apparatus further including
  - an air conducting duct interconnecting said supply air duct with said used air duct,
  - a cooling circuit including at least one blower for generating an appropriate air flow and a drive component cooler functioning as a heat source for said air stream, said blower and said cooler communicating with said air-conducting duct, said blower and said cooler being arranged one after the other in said air-conducting duct, said further air stream control element being positioned upstream of said cooler, and
  - a third air stream control element downstream of said cooler, said third air stream control element controlling the component comprising heating air introduced into said compartment and cooling air to be conducted to atmosphere, and wherein said sorption reactor is arranged downstream of said third air stream control element.

11. The apparatus as claimed in claim 10, further including heat developing auxiliary units, a battery unit, an electric control device, and a transmission of an electric vehicle, all connected to said cooling circuit, a coolant pump driven by means of an electric motor, and a latent heat accumulator incorporated in the cooling circuit for dampening heat fluctuations and delivering relatively constant temperature heat to said cooler.

12. The apparatus as claimed in claim 10, wherein said air conducting duct comprises at least three sections, a first section leading from the passenger compartment to a said air stream control element, a second section connecting said air stream control element to said third air stream control element, and a third section leading from the second air stream control element to the passenger compartment, said cooler and said blower being arranged in said second section.

13. The apparatus as claimed in claim 12, further including an air mixing chamber communicating with said fresh air duct, said mixing chamber being arranged in the third section immediately ahead of the entry into the passenger compartment, and a fourth air stream control element associated with said air mixing chamber, said fourth control element controlling, the components of the air streams coming from said reactor and from the fresh air duct.

14. The apparatus as claimed in claim 12, further including a further heat source in the form of an electric auxiliary heating means positioned in said third section.

15. The apparatus as claimed in claim 1, further including at least one evaporator disposed outside of the reactor by which cooling of the air stream is achieved by enrichment with moisture.

16. The apparatus as claimed in claim 15, wherein said at least one evaporator includes first and second evaporators, one of which is disposed upstream of said reactor in the air stream.

17. The apparatus as claimed in claim 8, wherein said heating device includes one of an electric radiator and a heat exchanger through which a waste heat air stream flows.

* * * * *